US010402458B2

(12) United States Patent
Tian

(10) Patent No.: US 10,402,458 B2
(45) Date of Patent: Sep. 3, 2019

(54) PAIR OF SPECTACLES WITH INQUIRY FUNCTION AND INQUIRING METHOD USING THE PAIR OF SPECTACLES

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Gang-Mou Tian, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/854,702

(22) Filed: Dec. 26, 2017

(65) Prior Publication Data

US 2019/0163827 A1    May 30, 2019

(30) Foreign Application Priority Data

Nov. 27, 2017  (CN) .......................... 2017 1 1207143

(51) Int. Cl.
| G06F 16/951 | (2019.01) |
| H04N 5/232 | (2006.01) |
| G06F 1/16 | (2006.01) |
| G06F 3/01 | (2006.01) |
| G06F 16/9038 | (2019.01) |
| G10L 15/22 | (2006.01) |

(52) U.S. Cl.
CPC ............ *G06F 16/951* (2019.01); *G06F 1/163* (2013.01); *G06F 3/015* (2013.01); *G06F 16/9038* (2019.01); *H04N 5/23219* (2013.01); *G10L 15/22* (2013.01)

(58) Field of Classification Search
CPC ............................... G06F 16/951; G06F 1/163
See application file for complete search history.

(56) References Cited

U.S. PATENT DOCUMENTS

| 2015/0199010 | A1* | 7/2015 | Coleman | .............. | A61B 5/0006 |
| | | | | | 345/156 |
| 2015/0338917 | A1* | 11/2015 | Steiner | .................. | H04L 9/3231 |
| | | | | | 345/156 |
| 2017/0328733 | A1* | 11/2017 | Gotoh | .................. | G01C 21/367 |
| 2018/0329728 | A1* | 11/2018 | Kim | ........................ | G06F 9/454 |

* cited by examiner

*Primary Examiner* — Eileen M Adams
(74) *Attorney, Agent, or Firm* — ScienBiziP, P.C.

(57) ABSTRACT

Smart spectacles able to detect electrical activity in the brain include a display unit, a camera, a brain central detection unit, and a processor. The camera can shoot an image of currently-watched content. The brain central detection unit can detect current of user's neuronal cell in the brain. The processor can accordingly determine whether user is excited by what he is watching. When the user's neuronal cell is not excited, the processor controls the camera to shoot image including currently-watched content, analyze the content in the image, and regard such content as a first searched object. The processor searches for target content corresponding to the first searched object from a database, and displays the target content on the display unit.

20 Claims, 4 Drawing Sheets

PAIR OF SPECTACLES WITH INQUIRY FUNCTION AND INQUIRING METHOD USING THE PAIR OF SPECTACLES

CROSS-REFERENCE TO RELATED APPLICATIONS

This application claims priority to Chinese Patent Application No. 201711207143.X filed on Nov. 27, 2017, the contents of which are incorporated by reference herein.

FIELD

The subject matter herein generally relates to information retrieval field, and particularly, to a pair of spectacles with inquiry function and an inquiring method using the pair of spectacles.

BACKGROUND

When a person recalls one event, the nerve cells in human brain are in a relatively excited state. However, when the person cannot recall something, the nerve cells are not active. Therefore, a pair of spectacles with inquiry function based on the excited state of the nerve cell would be useful.

BRIEF DESCRIPTION OF THE DRAWINGS

Implementations of the present disclosure will now be described, by way of example only, with reference to the attached figures.

DETAILED DESCRIPTION

Figure 1:
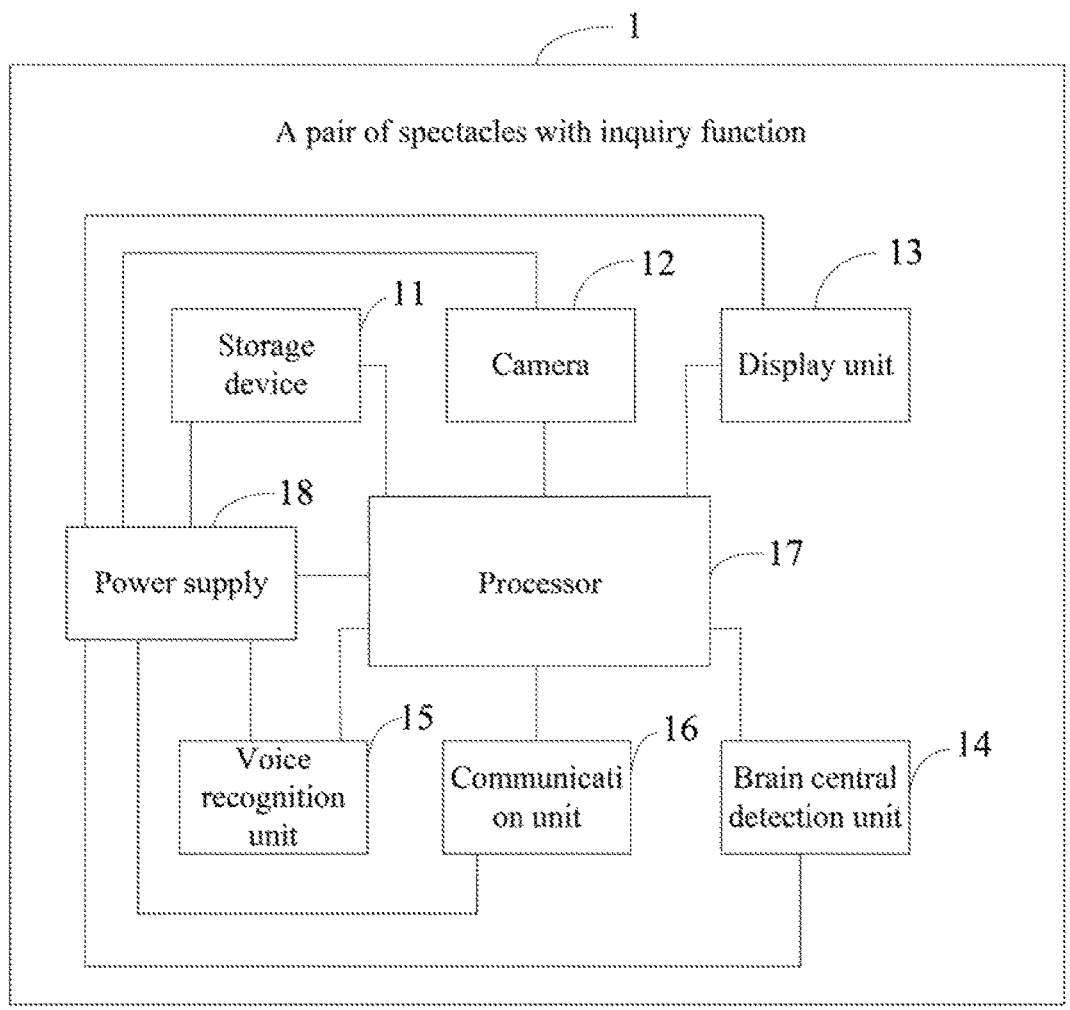
FIG. 1 is a block diagram of one embodiment of pair of spectacles with inquiry function.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Exemplary embodiments of the present disclosure will be described in relation to the accompanying drawings.

FIG. 1 illustrates a pair of spectacles 1 with inquiry function. The spectacles 1 include a storage device 11, a camera 12, a display unit 13, a brain central detection unit 14, a voice recognition unit 15, a communication unit 16, a processor 17 and a power supply 18. In at least one exemplary embodiment, the storage device 11 stores a searchable database of searching content. The searching content can be English words, the database can be English word library. In at another embodiment, the searching content can be music tracks, the database can be music library. In at least one exemplary embodiment, the storage device 11 can include various types of non-transitory computer-readable storage mediums. For example, the storage device 11 can be an internal storage system of the spectacles 1, such as a flash memory, a random access memory (RAM) for temporary storage of information, and/or a read-only memory (ROM) for permanent storage of information.

The camera 12 is can shoot an image including the searching content. For example, when the user wears the spectacles 1 and watches the searching content, the information acquiring unit 12 is able to shoot the image of searching content being watched. The display unit 13 is used to display data of the spectacles 1. In at least one exemplary embodiment, the display unit 13 can be a miniature LCD. The brain central detection unit 14 is used to detect current of user's neuronal cell. In at least one exemplary embodiment, the brain central detection unit 14 can be neuron radio wave detector. The voice recognition unit 15 is used to identify user's voice. In at least one exemplary embodiment, the voice recognition unit 15 can be a voice recognition chip.

Figure 2:
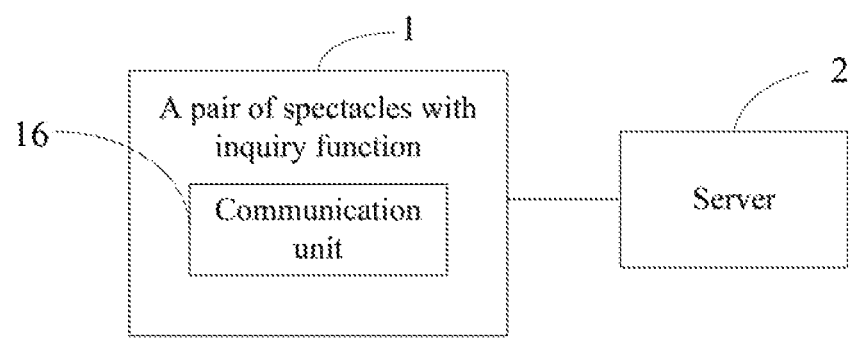
FIG. 2 is a block diagram of one embodiment of a running environment of the spectacles of FIG. 1.

FIG. 2 illustrates a running environment of the spectacles 1. The spectacles 1 communicate with a server 2 by the communication unit 16. In at least one exemplary embodiment, the communication unit 16 can be a WIFI communication module or 3G/4G communication module. The server 2 also stores the database of searching content. The processor 17 detects whether user's neuronal cell is excited by the brain central detection unit 14, controls the camera 12 to shoot an image when detecting that user's neuronal cell is excited, analyzes a first searched object from the image, searches in the stored content corresponding to the first searched object from the storage device 11 of the spectacles 1 or from the server 2, and displays the relevant part of the searching content on the display unit 13. In at least one exemplary embodiment, the processor 17 can be a central processing unit (CPU), a microprocessor, or other data processor chip. The power supply 18 can supply power for the storage device 11, the camera 12, the display unit 13, the brain central detection unit 14, the voice recognition unit 15, the communication unit 16, and the processor 17.

Figure 3:
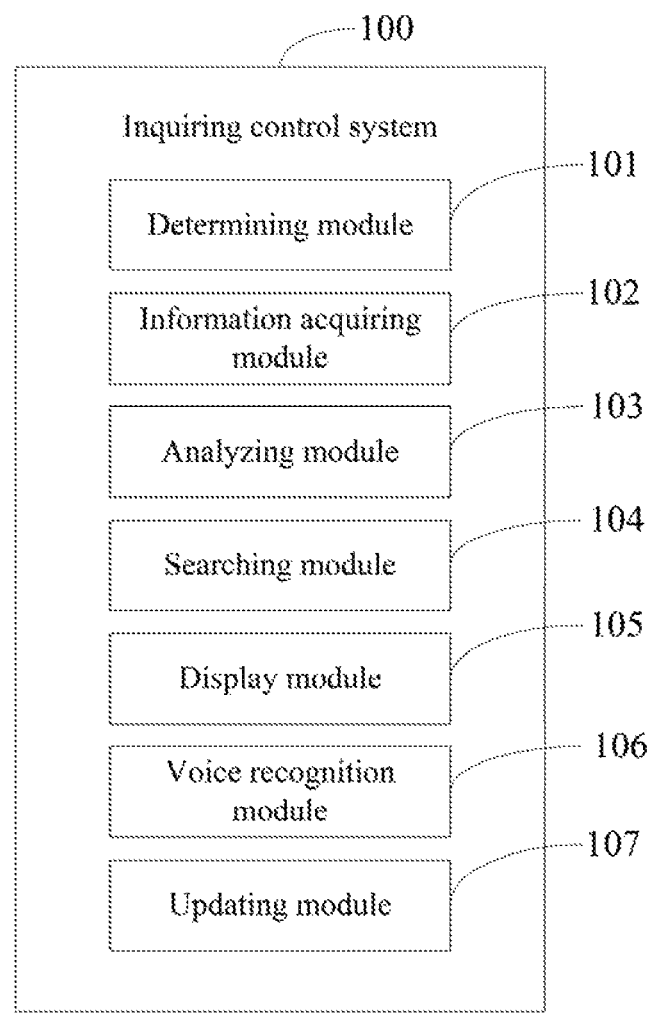
FIG. 3 is a block diagram of one embodiment of an inquiring control system.

FIG. 3 illustrates an inquiring control system 100. In at least one exemplary embodiment, the inquiring control system 100 includes, but is not limited to a determining module 101, an information acquiring module 102, an analyzing module 103, a searching module 104, and a display module 105. The modules 101-105 of the inquiring control system 100 can be collections of software instructions. In at least one exemplary embodiment, the software instructions of the determining module 101, the information acquiring module 102, the analyzing module 103, the searching module 104, and the display module 105 are stored in the storage device 11 and executed by the processor 17.

The determining module 101 determines state of user's neuronal cell according to the brain central detection unit 14. In at least one exemplary embodiment, the brain central detection unit 14 can detect electrical current of user's neuronal cell. The determining module 101 acquires the current of user's neuronal cell from the central detection unit 14, determines whether the current of user's neuronal cell is in a preset current range which indicates user's neuronal cell is excited. A user's neuronal cell is deemed excited when the current of user's neuronal cell is in the preset current range. In another embodiment, when the current of user's neuronal cell is out of the preset current range, the determining module 101 determines that user's neuronal cell is not excited. For example, when the user watches the searching content by the spectacles 1 and recalls the searching content, user's neuronal cell is excited and the current of user's neuronal cell will be in the preset current range. When the user can recall the searching content, but the current of user's neuronal cell is out of the preset current range, user's neuronal cell is not excited. The determining module 101 acquires the current of user's neuronal cell detected by the central detection unit 14, determines that user's neuronal cell is excited when the current of user's neuronal cell is in the preset current range, and determines that user's neuronal cell is not excited when the current of user's neuronal cell is out of the preset current range.

The information acquiring module 102 controls the camera 12 to shoot an image including the searching content when the user's neuronal cell is not excited. In at least one exemplary embodiment, when the user watches the searching content by the spectacles 1 and recalls the searching content, the determining module 101 determines that user's neuronal cell is not excited based on the level of current of user's neuronal cell detected by the central detection unit 14, and the information acquiring module 102 controls the camera 12 to shoot an image including currently-watched content when the user's neuronal cell is not excited.

The analyzing module 103 acquires the image shot by the camera 12, analyzes the searching content of the image, and regards as such content as a first searched object.

The searching module 104 searches for target content corresponding to the first searched object from the database stored in the storage device 11.

The display module 105 displays the target content on the display unit 13.

In at least one exemplary embodiment, the first searched object is English word, the database is English word library. For example, when user watches the English word by the spectacles 1, user's neuronal cell is not excited and the level of current of user's neuronal cell is out of the preset current range when user fails to recall the English word. The determining module 101 acquires the current of user's neuronal cell detected by the central detection unit 14, and determines that user's neuronal cell is not excited when the current of user's neuronal cell is out of the preset current range. The information acquiring module 102 controls the camera 12 to shoot an image including the English word when the user's neuronal cell is not excited. The analyzing module 103 acquires the image shot by the camera 12, analyzes the English word from the image, and regards as the English word as a first searched object. The searching module 104 searches for target content corresponding to the English word from the English word library stored in the storage device 11. The display module 105 displays the target content corresponding to the English word on the display unit 13. In at least one exemplary embodiment, the target content corresponding to the English word can be a paraphrase of the English word.

In at least one exemplary embodiment, when the target object is not found in the storage device 11, the searching module 104 searches the server 2 communicating with the spectacles 1 to acquire the target object corresponding to the first searched object. The display module 105 displays the target object on the display unit 13.

In at least one exemplary embodiment, the inquiring control system 100 further includes a voice recognition module 106. The voice recognition module 106 recognizes user's voice by the voice recognition unit 15, and analyzes a second searched object from the user's voice. The searching module 104 searches for the target content corresponding to the second searched object from the database stored in the storage device 11. The display module 105 displays the target content corresponding to the second searched object on the display unit 13. For example, when user speaks about an English word, and searching for it, the voice recognition module 106 recognizes user's voice about searching for English word, by the voice recognition unit 15, and analyzes English word included in the spoken voice and sets the English word as a second searched object. The searching module 104 searches for the target content corresponding to the English word from the English word library stored in the storage device 11. The display module 105 displays the target content corresponding to the English word on the display unit 13.

In at least one exemplary embodiment, the inquiring control system 100 further includes an updating module 107. The updating module 107 updates the target content searched from the server 2 into the database stored in the storage device 11.

In at least one exemplary embodiment, the searching module 104 also records searching frequencies of the first searched object and the second searched object, sorts such objects according to the searching frequencies, and stores the sorted first searched object and the second searched object in the database in the storage device 11.

Figure 4:
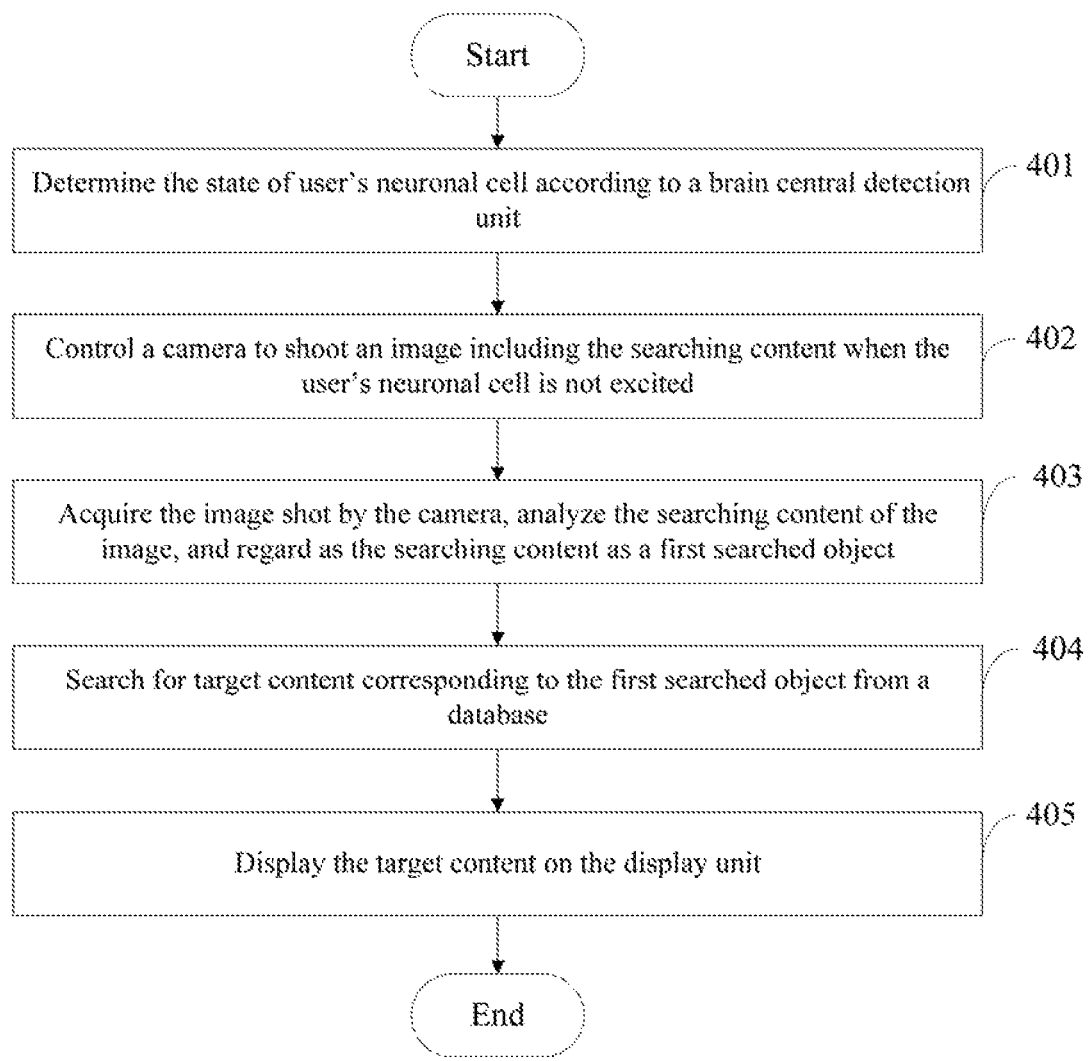
FIG. 4 is a flowchart of one embodiment of an inquiring method using the spectacles of FIG. 1.

FIG. 4 illustrates a flowchart of one embodiment of an inquiring method. The inquiring method is applied in a spectacles with inquiry function. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, the spectacles determine the state of user's neuronal cell according to a brain central detection unit.

In at least one exemplary embodiment, the brain central detection unit 14 can detect current of user's neuronal cell. The spectacles acquire the current of user's neuronal cell from the central detection unit, determine whether the current of user's neuronal cell is in a preset current range which indicates user's neuronal cell is excited, and determine user's neuronal cell is excited when the current of user's neuronal cell is in the preset current range. In another embodiment, when the current of user's neuronal cell is out of the preset current range, the spectacles determine that user's neuronal cell is not excited. For example, when the user watches the searching content by the spectacles and recalls the searching content, user's neuronal cell is excited and the current of user's neuronal cell will be in the preset current range. When the user can recall the searching content, but the current of user's neuronal cell is out of the preset current range, user's neuronal cell is not excited. The spectacles acquire the current of user's neuronal cell detected by the central detection unit, determine that user's neuronal cell is excited when the current of user's neuronal cell is in the preset current range, or determine that user's neuronal cell is not excited when the current of user's neuronal cell is out of the preset current range.

At block 402, the spectacles control a camera to shoot an image including the searching content when the user's neuronal cell is not excited. In at least one exemplary embodiment, when the user watches the searching content by the spectacles and recalls the searching content, the spectacles determine that user's neuronal cell is not excited based on the current of user's neuronal cell detected by the central detection unit and controls the camera to shoot the image including the searching content when the user's neuronal cell is not excited.

At block 403, the spectacles acquire the image shot by the camera, analyzes the searching content of the image, and regard as the searching content as a first searched object.

At block 404, the spectacle search for target content corresponding to the first searched object from a database.

At block 405, the spectacles display the target content on the display unit.

In at least one exemplary embodiment, the first searched object is English word, the database is English word library. For example, when the user watches the English word by the spectacles, user's neuronal cell is not excited and the level of current of user's neuronal cell is out of the preset current range when the user fails to recall the English word. The spectacles acquire the current of user's neuronal cell detected by the central detection unit, determines that user's neuronal cell is not excited when the current of user's neuronal cell is out of the preset current range. The spectacles control the camera to shoot an image including the English word when the user's neuronal cell is not excited. The spectacles further analyze the English word from the image and regards as the English word as a first searched object. The spectacles further search target content corresponding to the English word from the English word library stored in the storage device, and displays the target content corresponding to the English word on the display unit. In at least one exemplary embodiment, the target content corresponding to the English word can be a paraphrase of the English word.

In at least one exemplary embodiment, the method further includes: when the target object is not found in the storage device, the spectacles search a server communicating with the spectacles to acquire the target object corresponding to the first searched object, and displays the target object on the display unit.

In at least one exemplary embodiment, the method further includes: the spectacles recognize user's voice by a voice recognition unit, analyzes a second searched object form the user's voice, searches the target content corresponding to the second searched object from the database stored in the storage device, and displays the target content corresponding to the second searched object on the display unit 13.

In at least one exemplary embodiment, the method further includes: the spectacles update the target content searched from the server into the database stored in the storage device.

In at least one exemplary embodiment, the method further includes: the spectacles record searching frequencies of the first searched object and the second searched object, sort the first searched object and the second searched object according to the searching frequencies, and store the sorted first searched object and the second searched object in the database in the storage device.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A pair of spectacles with inquiry function comprising:
A display unit of the pair of spectacles;
a camera of the pair of spectacles configured to shoot an image;
a brain central detection unit of the pair of spectacles configured to detect a current of a user's neuronal cell;
a processor of the pair of spectacles coupled to the display unit, the camera, and the brain central detection unit; and
a non-transitory storage medium of the pair of spectacles coupled to the processor and configured to store a plurality of instructions, which cause the processor to:
determine an unexcited state of the user's neuronal cell according to the brain central detection unit, wherein the plurality of instructions is further configured to cause the processor to acquire the current of the user's neuronal cell from the central detection unit, determine whether the current of the user's neuronal cell is in a preset current range which indicates the user's neuronal cell is excited, and determine the user's neuronal cell is not excited when the current of the user's neuronal cell is out of the preset current range;
control the camera to shoot the image when the user's neuronal cell is not excited;
acquire the image shot by the camera, analyze words of the image, and regard the words as a first searched object;
search for target content corresponding to the first searched object from a database; and
display the target content on the display unit.

2. The pair of spectacles with inquiry function according to claim 1, wherein the plurality of instructions is further configured to cause the processor to:
determine the user's neuronal cell is excited when the current of the user's neuronal cell is in the preset current range.

3. The pair of spectacles with inquiry function according to claim 1, wherein the pair of spectacles further comprises a voice recognition unit, the plurality of instructions is further configured to cause the processor to:
  recognize user's voice by the voice recognition unit;
  analyze a second searched object form the user's voice;
  search for the target content corresponding to the second searched object from the database; and
  display the target content corresponding to the second searched object on the display unit.

4. The pair of spectacles with inquiry function according to claim 1, wherein the database is stored in the pair of spectacles.

5. The pair of spectacles with inquiry function according to claim 4, wherein the pair of spectacles further comprises a communication unit by which the pair of spectacles communicates with a server, the plurality of instructions is further configured to cause the processor to:
  when the target object is not found in the storage device, search the server to acquire the target object corresponding to the first searched object; and
  display the target object on the display unit.

6. The pair of spectacles with inquiry function according to claim 5, wherein the plurality of instructions is further configured to cause the processor to:
  update the target content searched from the server into the database stored in the pair of spectacles.

7. The pair of spectacles with inquiry function according to claim 4, wherein the plurality of instructions is further configured to cause the processor to:
  record searching frequencies of the first searched object and the second searching object;
  sort the first searching object and the second searching object according to the searching frequencies; and
  store the sorted first searched object and the second searching object in the database in the storage device.

8. An inquiring method using a pair of spectacles comprising:
  determining an unexcited state of a user's neuronal cell according to a brain central detection unit of the pair of spectacles, wherein acquiring a current of the user's neuronal cell from a central detection unit, determining whether the current of the user's neuronal cell is in a preset current range which indicates the user's neuronal cell is excited, and determining the user's neuronal cell is not excited when the current of the user's neuronal cell is out of the preset current range;
  controlling a camera of the pair of spectacles to shoot an image when the user's neuronal cell is not excited;
  acquiring the image shot by the camera, analyze words of the image, and regard the words as a first searched object;
  searching for target content corresponding to the first searched object from a database; and
  displaying the target content on a display unit of the pair of spectacles.

9. The inquiring method using a pair of spectacles according to claim 8 further comprising:
  determining the user's neuronal cell is excited when the current of user's neuronal cell is in the preset current range.

10. The inquiring method using a pair of spectacles according to claim 8 further comprising:
  recognizing user's voice by a voice recognition unit of the pair of spectacles;
  analyzing a second searched object form the user's voice;
  searching for the target content corresponding to the second searched object from the database; and
  displaying the target content corresponding to the second searched object on the display unit.

11. The inquiring method using a pair of spectacles according to claim 8, wherein the database is stored in the pair of spectacles.

12. The inquiring method using a pair of spectacles according to claim 11 further comprising
  when the target object is not found in the storage device, searching the server to acquire the target object corresponding to the first searched object; and
  displaying the target object on the display unit.

13. The inquiring method using a pair of spectacles according to claim 12 further comprising:
  updating the target content searched from the server into the database stored in the pair of spectacles.

14. The inquiring method using a pair of spectacles according to claim 11 further comprising:
  recording searching frequencies of the first searched object and the second searched object;
  sorting the first searched object and the second searched object according to the searching frequencies; and
  storing the sorted first searched object and the second searched object in the database in the storage device.

15. A non-transitory storage medium having stored thereon instructions that, when executed by a processor of a pair of spectacles, causes the processor to execute instructions of an inquiring method using the pair of spectacles, the method comprising:
  determining an unexcited state of a user's neuronal cell according to a brain central detection unit of the pair of spectacles, wherein acquiring a current of the user's neuronal cell from a central detection unit, determining whether the current of the user's neuronal cell is in a preset current range which indicates the user's neuronal cell is excited, and determining the user's neuronal cell is not excited when the current of the user's neuronal cell is out of the preset current range;
  controlling a camera of the pair of spectacles to shoot an image when the user's neuronal cell is not excited;
  acquiring the image shot by the camera, analyze words from the image, and regard the words as a first searched object;
  searching for target content corresponding to the first searched object from a database; and
  displaying the target content on a display unit of the pair of spectacles.

16. The non-transitory storage medium according to claim 15, wherein the method is further comprising:
  determining the user's neuronal cell is excited when the current of the user's neuronal cell is in the preset current range.

17. The non-transitory storage medium according to claim 15, wherein the method is further comprising:
  recognizing user's voice by a voice recognition unit of the pair of spectacles;
  analyzing a second searched object form the user's voice;
  searching for the target content corresponding to the second searched object from the database; and
  displaying the target content corresponding to the second searched object on the display unit.

18. The non-transitory storage medium according to claim 15, wherein the database is stored in the pair of spectacles.

19. The non-transitory storage medium according to claim 18, wherein the method is further comprising:

when the target object is not found in the storage device, searching a server communicate with the pair of spectacles to acquire the target object corresponding to the first searched object; and displaying the target object on the display unit.

20. The non-transitory storage medium according to claim 19, wherein the method is further comprising:

update the target content searched from the server into the database stored in the pair of spectacles.

* * * * *